US009947191B2

(12) United States Patent
Wada et al.

(10) Patent No.: US 9,947,191 B2
(45) Date of Patent: *Apr. 17, 2018

(54) MONITORING SYSTEM

(71) Applicant: Panasonic Intellectual Property Management Co., Ltd., Osaka (JP)

(72) Inventors: Nobuyuki Wada, Fukuoka (JP); Mitsuru Kawamura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 219 days.

This patent is subject to a terminal disclaimer.

(21) Appl. No.: 14/665,909

(22) Filed: Mar. 23, 2015

(65) Prior Publication Data
US 2015/0294542 A1 Oct. 15, 2015

(30) Foreign Application Priority Data

Apr. 9, 2014 (JP) ................................. 2014-080333

(51) Int. Cl.
*H04N 7/18* (2006.01)
*G08B 13/196* (2006.01)

(52) U.S. Cl.
CPC ..... *G08B 13/19658* (2013.01); *G08B 13/196* (2013.01); *G08B 13/19669* (2013.01); *H04N 7/183* (2013.01); *H04N 7/188* (2013.01)

(58) Field of Classification Search
None
See application file for complete search history.

(56) References Cited

U.S. PATENT DOCUMENTS

| 6,826,607 B1* | 11/2004 | Gelvin | B60R 25/1004 |
| | | | 340/539.19 |
| 8,780,201 B1 | 7/2014 | Scalisi et al. | |
| 2002/0126009 A1* | 9/2002 | Oyagi | G08B 25/10 |
| | | | 340/541 |
| 2004/0227817 A1* | 11/2004 | Oya | G06F 3/017 |
| | | | 348/155 |
| 2004/0246128 A1* | 12/2004 | Menard | A61B 5/0002 |
| | | | 340/539.19 |
| 2006/0209176 A1* | 9/2006 | Nakamura | G08B 25/10 |
| | | | 348/14.01 |
| 2007/0282177 A1* | 12/2007 | Pilz | A61B 5/411 |
| | | | 600/301 |

(Continued)

FOREIGN PATENT DOCUMENTS

| JP | 2000-099862 A | 4/2000 |
| JP | 2000-307740 A | 11/2000 |

(Continued)

OTHER PUBLICATIONS

International Search Report and Written Opinion dated Jul. 16, 2015, for corresponding International Application No. PCT/JP2015/001296, 32 pages.

Primary Examiner — Mohammed Rahaman
(74) Attorney, Agent, or Firm — Seed IP Law Group LLP

(57) ABSTRACT

A master device stores audio data and image data transmitted from an outdoor monitoring camera in an image memory and transmits the data to a mobile phone terminal, the mobile phone terminal includes a display/input unit, displays the image data and a predetermined icon on the display/input unit, and transmits a request signal for stopping the storage operation performed by the master device to the master device when a predetermined operation is performed on the predetermined icon, and the master device stops storing the audio data and the image data in the image memory.

6 Claims, 14 Drawing Sheets

(56) References Cited

U.S. PATENT DOCUMENTS

| | | | | |
|---|---|---|---|---|
| 2009/0261943 | A1* | 10/2009 | Jana | G08B 25/08 340/3.1 |
| 2010/0117849 | A1* | 5/2010 | Clayton | G06F 21/554 340/691.6 |
| 2010/0195810 | A1 | 8/2010 | Mota et al. | |
| 2011/0176011 | A1* | 7/2011 | Swamidas | G08B 13/19656 348/207.11 |
| 2011/0190952 | A1* | 8/2011 | Goldstein | H02J 3/32 700/291 |
| 2013/0057695 | A1 | 3/2013 | Huisking | |

FOREIGN PATENT DOCUMENTS

| | | |
|---|---|---|
| JP | 2002-010369 A | 1/2002 |
| JP | 2002-290577 A | 10/2002 |
| JP | 2002-330230 A | 11/2002 |
| JP | 2002-368890 A | 12/2002 |
| JP | 2003-032377 A | 1/2003 |
| JP | 2003-179697 A | 6/2003 |
| JP | 2004-145643 A | 5/2004 |
| JP | 2004-200809 A | 7/2004 |
| JP | 2004-328059 A | 11/2004 |
| JP | 2005-109793 A | 4/2005 |
| JP | 2006-005550 A | 1/2006 |
| JP | 2006-184985 A | 7/2006 |
| JP | 2007-179555 A | 7/2007 |
| JP | 2007-323533 A | 12/2007 |
| JP | 2008-187505 A | 8/2008 |
| JP | 2011-155416 A | 8/2011 |
| JP | 2012-044587 A | 3/2012 |
| JP | 2013-098936 A | 5/2013 |
| JP | 2013-175819 A | 9/2013 |
| JP | 29130196562 A | 9/2013 |
| WO | 2011/024361 A1 | 3/2011 |

* cited by examiner

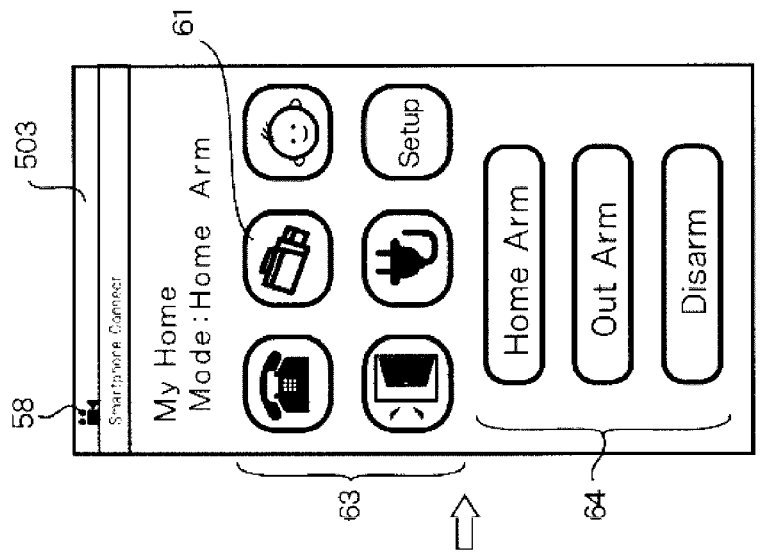
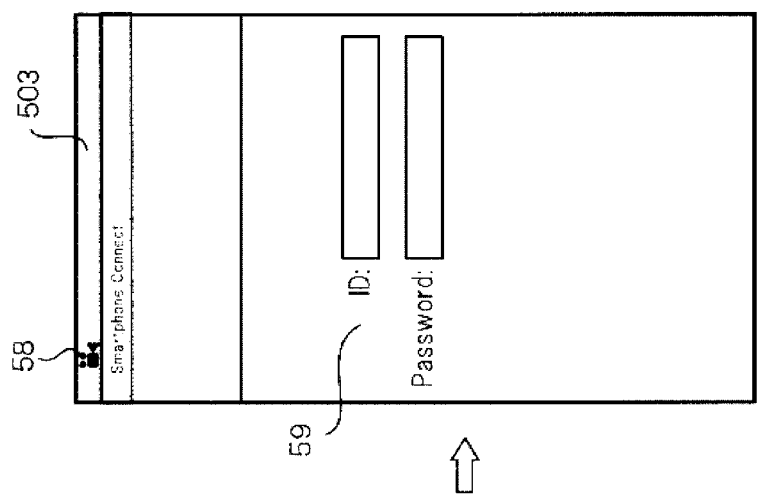
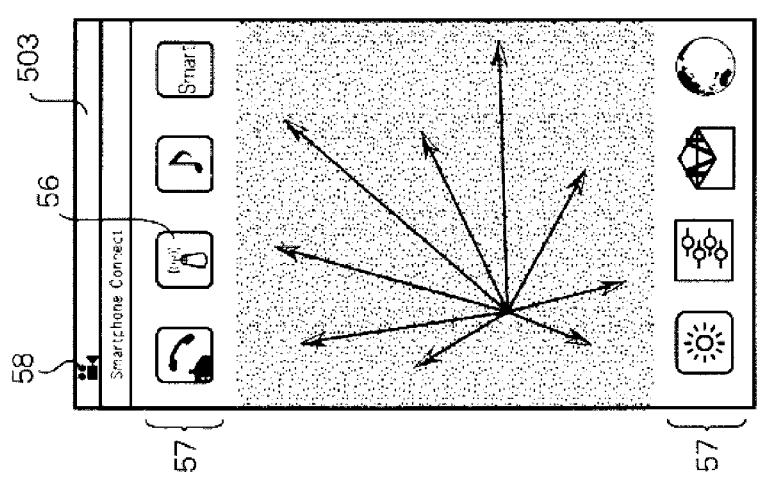

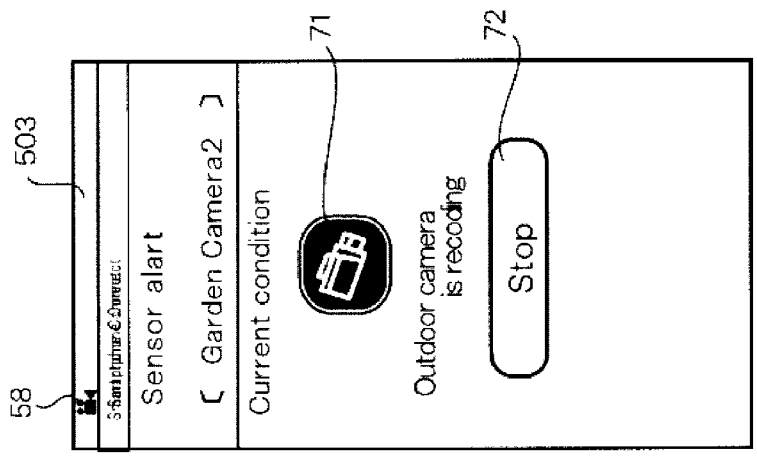
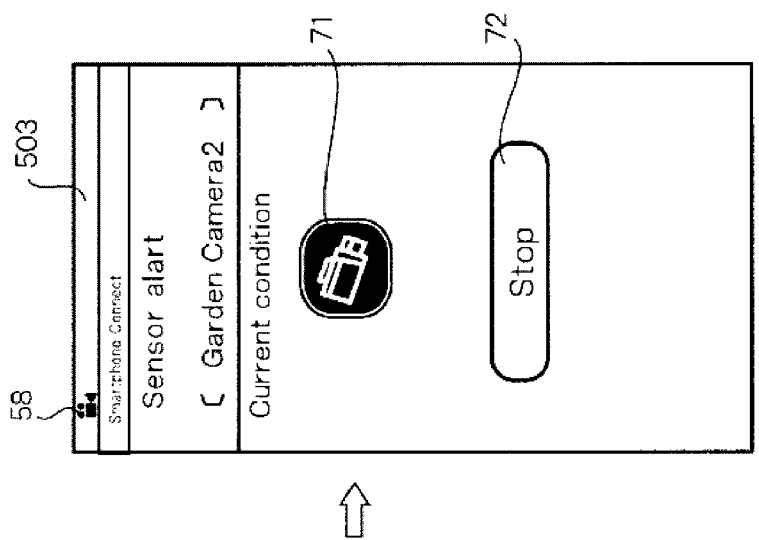
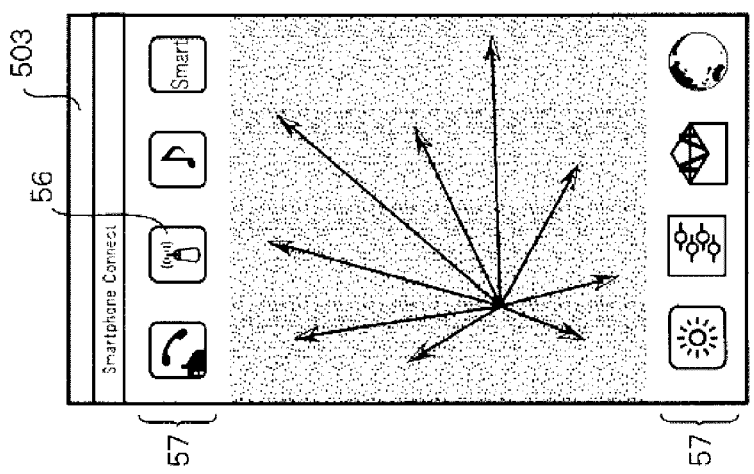

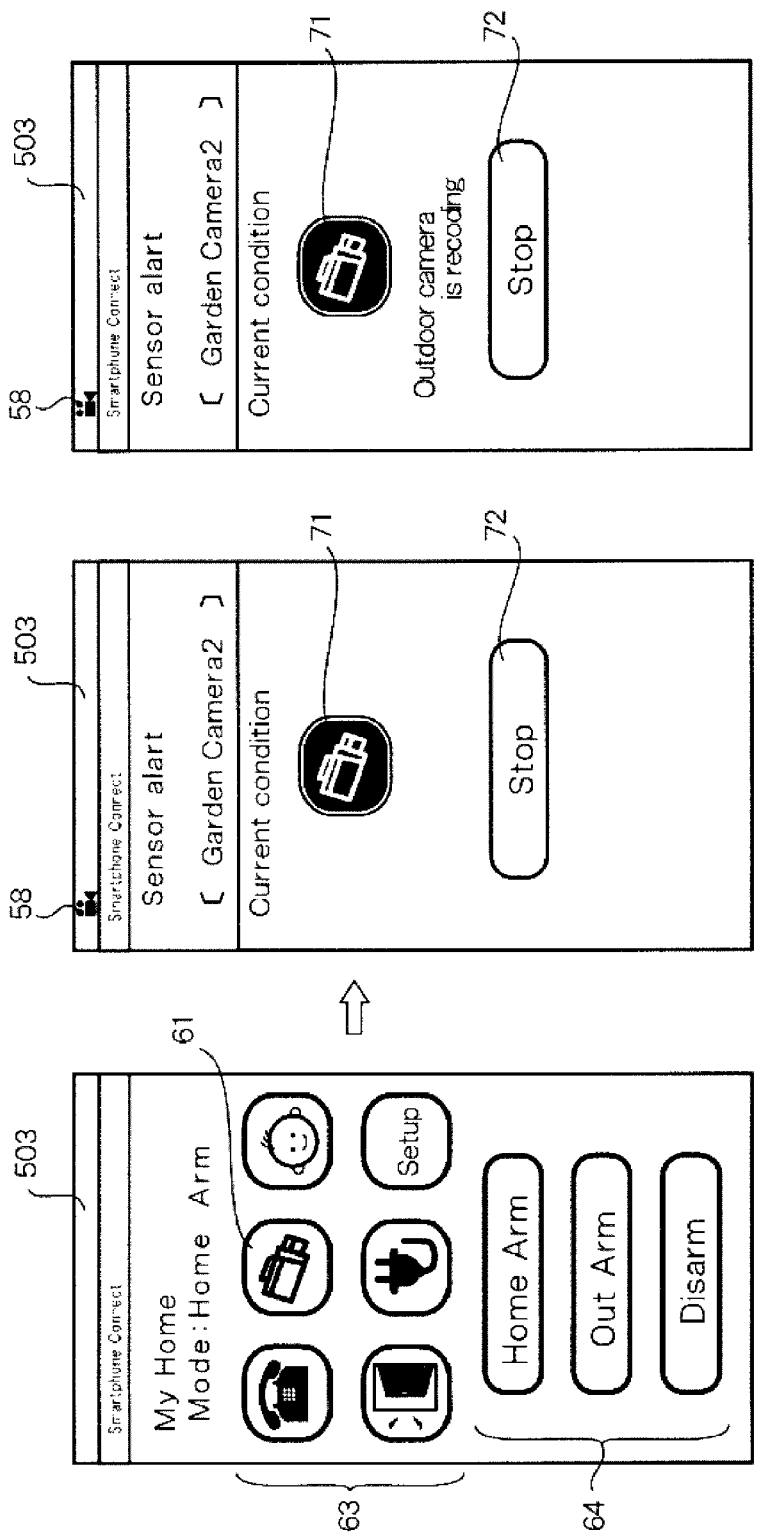

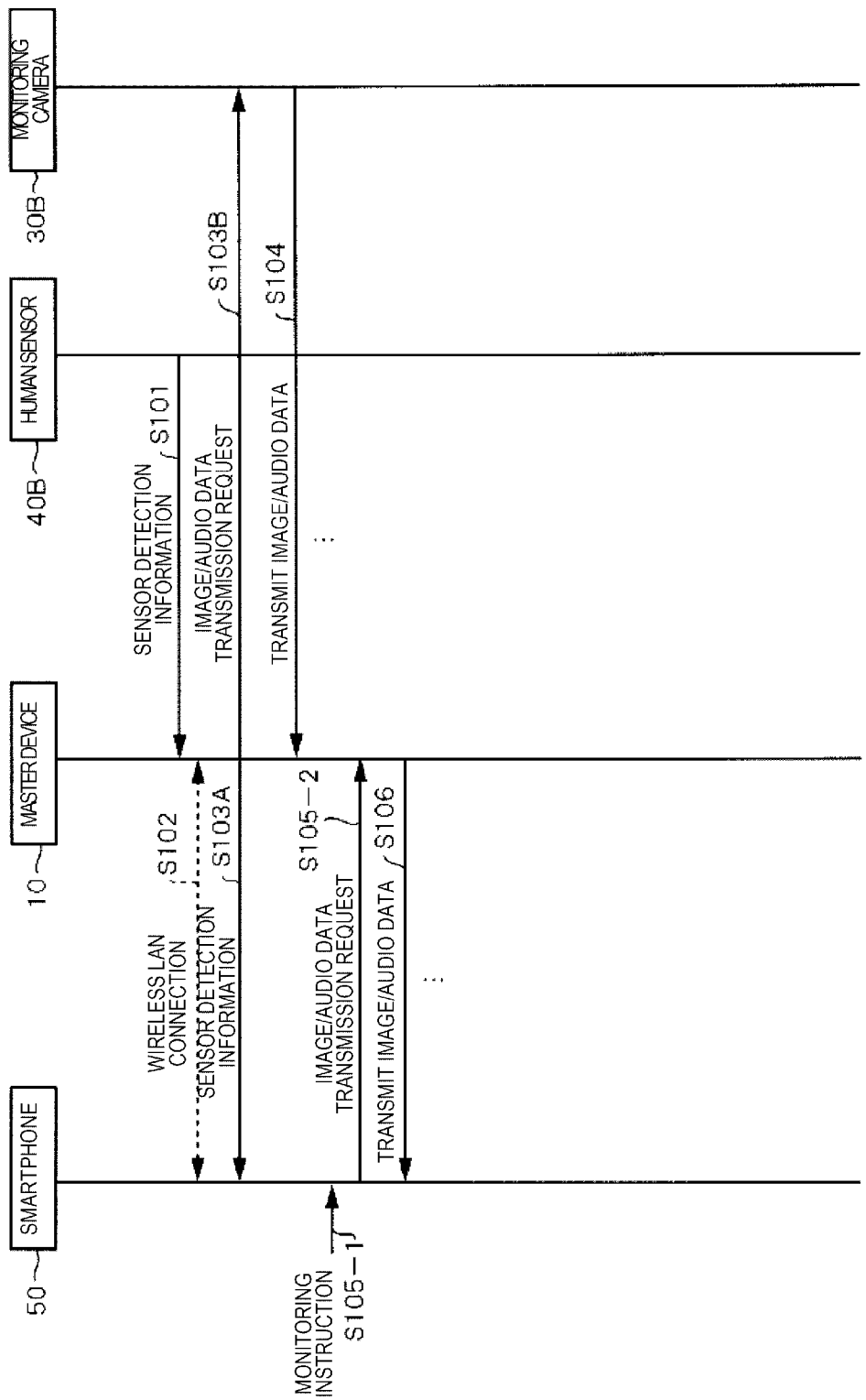

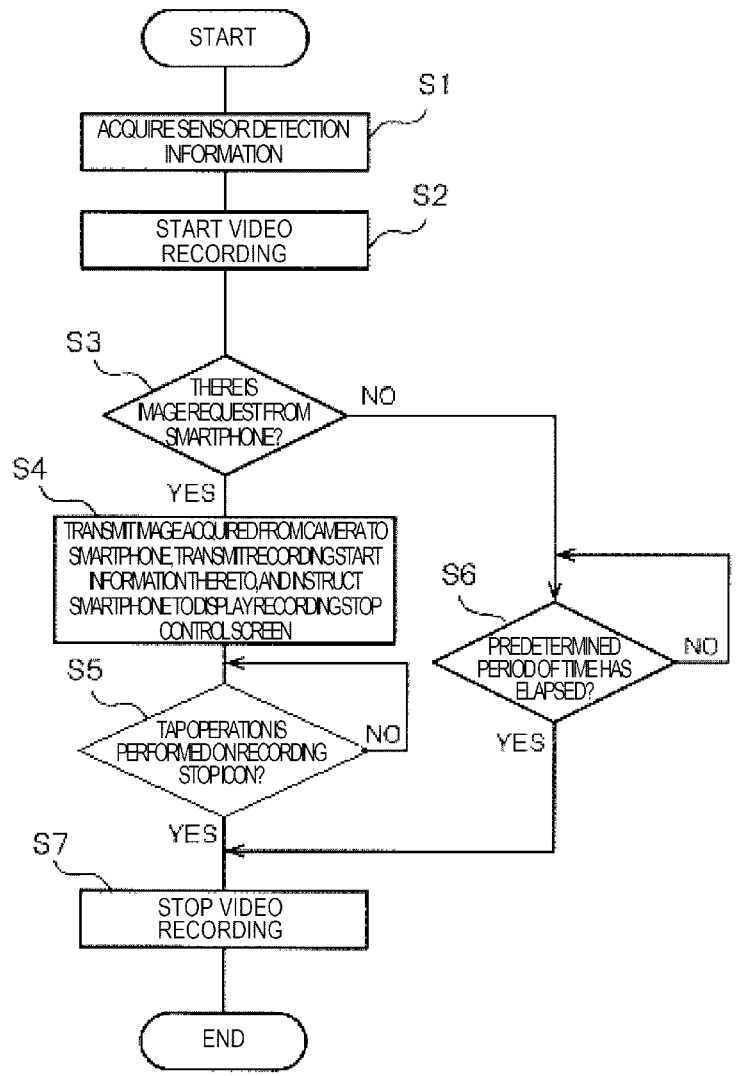

MONITORING SYSTEM

BACKGROUND OF THE INVENTION

1. Field of the Invention

The present invention relates to a monitoring camera system which performs data input and output to and from a camera.

2. Description of the Related Art

In the related art, as an example of a communication system which performs data input and output to and from a camera, there is a monitoring camera system which monitors an intruder who enters a house lot. A monitoring camera system disclosed in Japanese Patent Unexamined Publication No. 2000-99862 includes a home server which can record video and sound, an infrared sensor, a video camera, and a microphone. In a case where the infrared sensor detects an intruder, the home server records a video of the intruder and also records sound of the intruder by using the video camera and the microphone.

However, in the above-described patent document, in a case where the sensor detects the intruder, image data indicating a video captured by the video camera and audio data of sound collected by the microphone are just recorded by the home server.

If the all image data until a target (intruder) is no longer detected by a sensor after the detection of the target is recorded on a recording medium, a data amount thereof is very large.

Since image data of unnecessary scenes is also recorded in time series, a long time is necessary in work in which a user reproduces the image data recorded on the recording medium after the image data is recorded and confirms contents thereof. In a case where the recorded image data is edited, the work requires much time and effort. A large capacity recording medium is necessary in recording image data for a long period of time.

SUMMARY OF THE INVENTION

In order to solve the above-described problems, an object of the present invention is to provide a monitoring camera system which prevents image data which is not needed by a user from being stored through a simple operation when image data transmitted from a camera is stored.

According to the present invention, there is provided a monitoring camera system used for home security, including a human sensor; an outdoor monitoring camera that includes a microphone and an image capturing unit, and has a call function; a master device that communicates with the outdoor monitoring camera, and is connected to a fixed telephone network so as to perform calls to other fixed telephones; and a mobile phone terminal that performs wireless communication with the master device by using a wireless router, and is connected to other mobile phones via a mobile phone network, in which, when the human sensor detects a person, the outdoor monitoring camera transmits audio data collected by the microphone and image data obtained by the image capturing unit to the master device, in which the master device includes an image memory, starts storing the audio data and the image data transmitted from the outdoor monitoring camera in the image memory, and transmits the audio data and the image data to the mobile phone terminal, in which the mobile phone terminal includes a display/input unit, displays the image data transmitted from the master device and a predetermined icon on the display/input unit, and transmits a request signal for stopping the storage operation of the master device to the master device when a predetermined operation is performed on the predetermined icon, and in which, when the request signal is received, the master device stops storing the audio data and the image data in the image memory.

According to the present invention, it is possible to prevent image data which is not needed by a user from being stored in an image storage unit when image data transmitted from a camera is stored.

BRIEF DESCRIPTION OF DRAWINGS

FIG. 8A is a diagram illustrating transition of a screen of smartphone 50 when an application of the monitoring camera is activated;

FIG. 8B is a diagram illustrating transition of the screen of smartphone 50 when an application of the monitoring camera is activated;

FIG. 8C is a diagram illustrating transition of a screen of smartphone 50 when an application of the monitoring camera is activated;

FIG. 10A is a diagram illustrating transition of a screen of the smartphone when a human sensor detects a target during display of a standby screen;

FIG. 10B is a diagram illustrating transition of the screen of the smartphone when a human sensor detects a target during display of a standby screen;

FIG. 10C is a diagram illustrating transition of the screen of the smartphone when a human sensor detects a target during display of a standby screen;

FIG. 11A is a diagram illustrating transition of a screen of the smartphone when the human sensor detects a target during display of a home screen of an application for home security;

FIG. 11B is a diagram illustrating transition of the screen of the smartphone when the human sensor detects a target during display of a home screen of an application for home security;

FIG. 11C is a diagram illustrating transition of a screen of the smartphone when the human sensor detects a target during display of a home screen of an application for home security;

FIG. 12 is a sequence diagram illustrating a flow of an operation of the monitoring camera system;

FIG. 14 is a flowchart illustrating an operation procedure of the master device.

DETAILED DESCRIPTION OF THE PREFERRED EMBODIMENT

With reference to the drawings, a description will be made of an embodiment (hereinafter, referred to as "the present embodiment") of a monitoring camera system related to the present invention.

Figure 1:
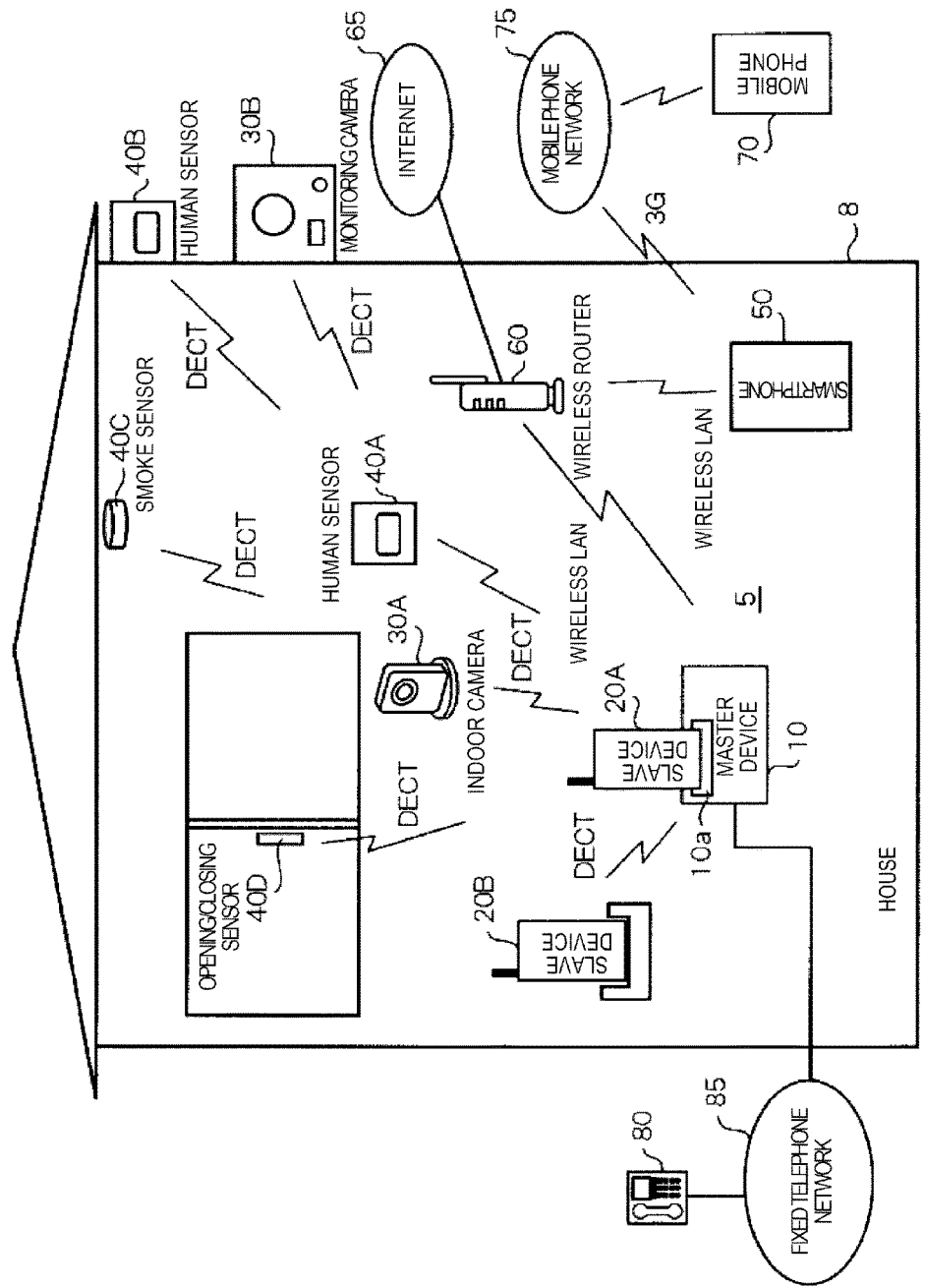
FIG. 1 is a diagram illustrating a system configuration of a monitoring camera system of the present embodiment.

FIG. 1 is a diagram illustrating a system configuration of monitoring camera system 5 of the present embodiment. Monitoring camera system 5 is mainly provided in house 8, and includes master device 10, two slave devices 20A and 20B, two cameras (specifically, indoor camera 30A and monitoring camera 30B), various sensors (specifically, human sensors 40A and 40B, smoke sensor 40C, and opening/closing sensor 40D), smartphone 50, and wireless router 60. A configuration of monitoring camera system 5 is only an example and may be modified in various aspects.

Master device (gateway) 10 is a control device which controls the entire operation of monitoring camera system 5, and is connected to the slave devices, the cameras, the sensors, and the like in a communicable manner by using a communication method such as digital enhanced cordless telecommunications (DECT). Master device 10 is connected to Internet 65 (network) via wireless router 60 using a wireless LAN. Master device 10 is connected to fixed telephone network 85 in a wired manner and can perform a call to fixed telephone 80. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, and opening/closing sensor 40D) are connected to master device in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

The two cameras (specifically, indoor camera 30A and monitoring camera 30B) have a call function and are connected to master device 10 in the DECT communication method. Herein, as cameras, monitoring camera 30B which captures an image of an outdoor environment, and indoor camera 30A which captures an image of house 8, are used. Particularly, in a case where the cameras are not required to be differentiated from each other, the cameras are collectively referred to as camera 30.

Smartphone 50 is connected to master device 10 via wireless router 60 using a wireless LAN, and is connected to mobile phone 70 or other smartphones via mobile phone network 75 using a communication method such as the third generation (3G) method.

Figure 2:
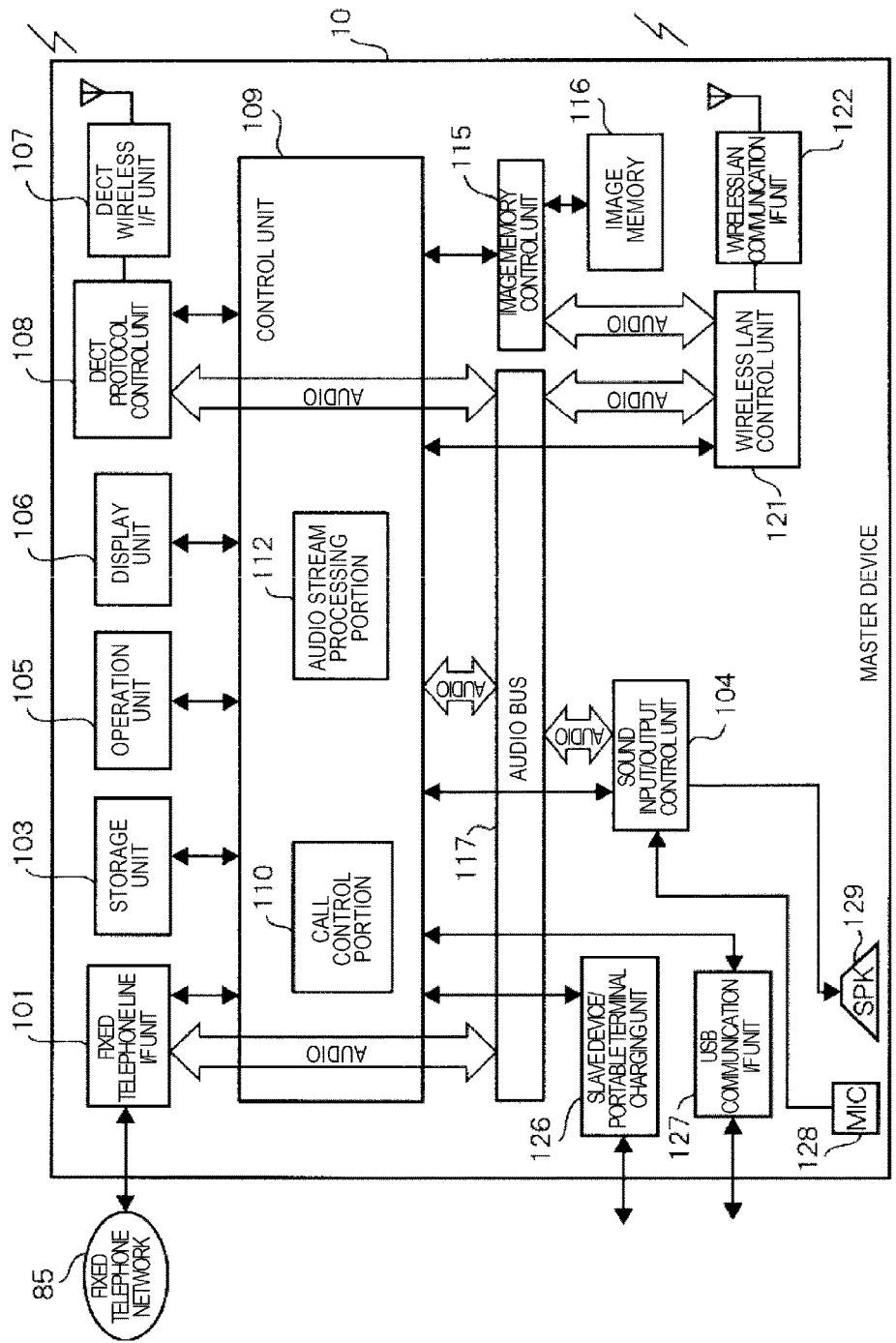
FIG. 2 is a block diagram illustrating an internal configuration of a master device.

FIG. 2 is a block diagram illustrating an internal configuration of master device 10. Master device 10 includes control unit 109, storage unit 103, operation unit 105, and display unit 106. Master device 10 receives various input operations and displays information such as image on display unit 106. Control unit 109 has call control portion 110 and audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 80 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers various sensors 40 and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with indoor camera 30A.

Figure 3:
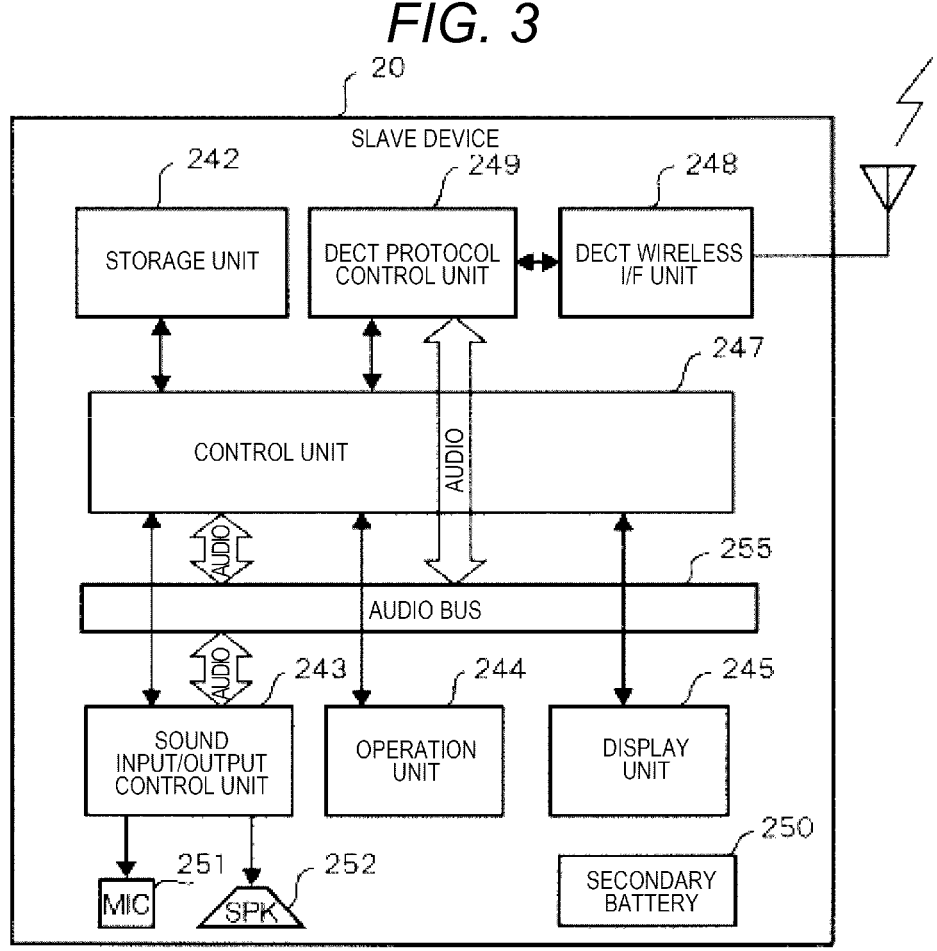
FIG. 3 is a block diagram illustrating an internal configuration of a slave device.

FIG. 3 is a block diagram illustrating an internal configuration of slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Figure 4:
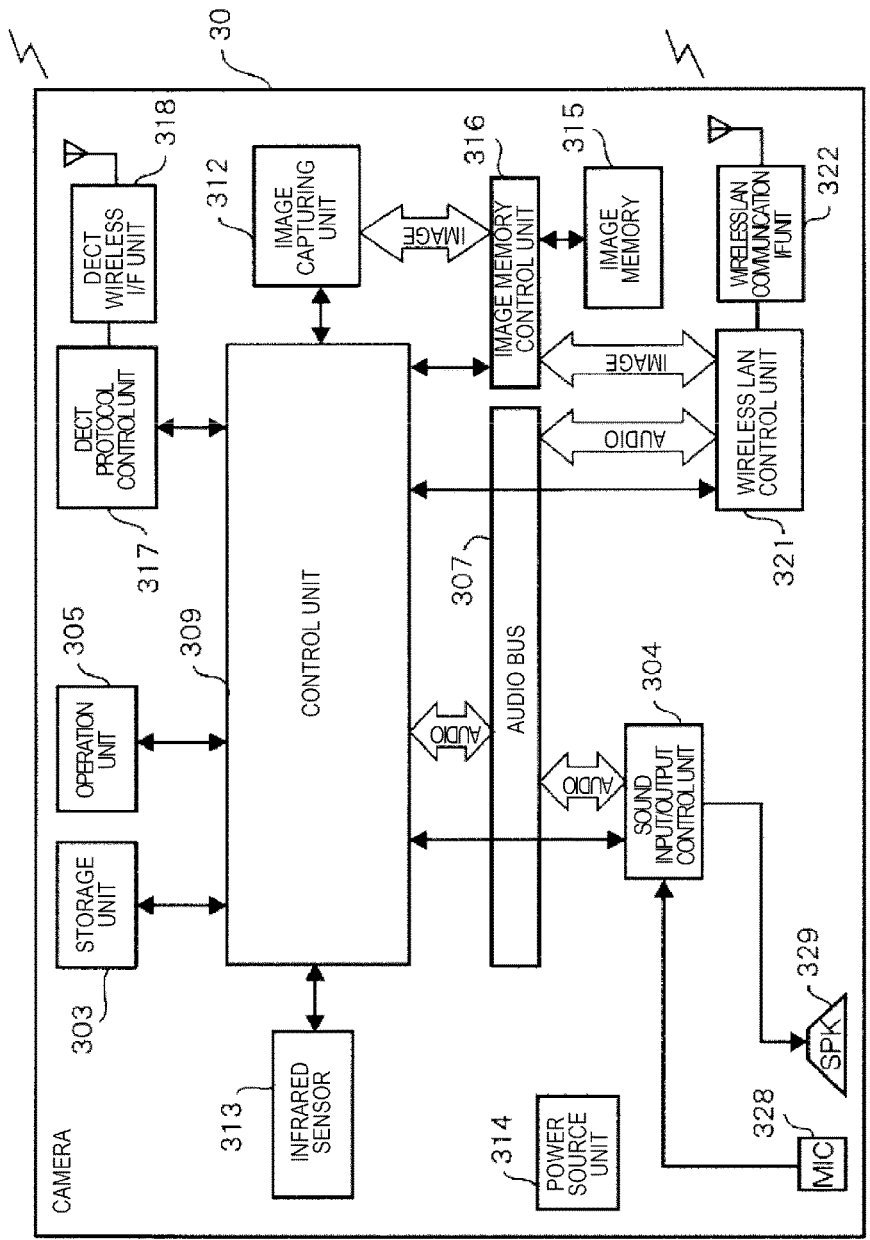
FIG. 4 is a block diagram illustrating an internal configuration of a camera.

FIG. 4 is a block diagram illustrating an internal configuration of camera 30. Indoor camera 30A and monitoring camera 30B as examples of cameras 30 have substantially the same specification as each other. Camera 30 includes control unit 309, storage unit 303, and operation unit 305. Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and a wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared rays) generated by the person. Camera 30 includes power source unit 314 which is constituted by a commercial AC power source.

Figure 5:
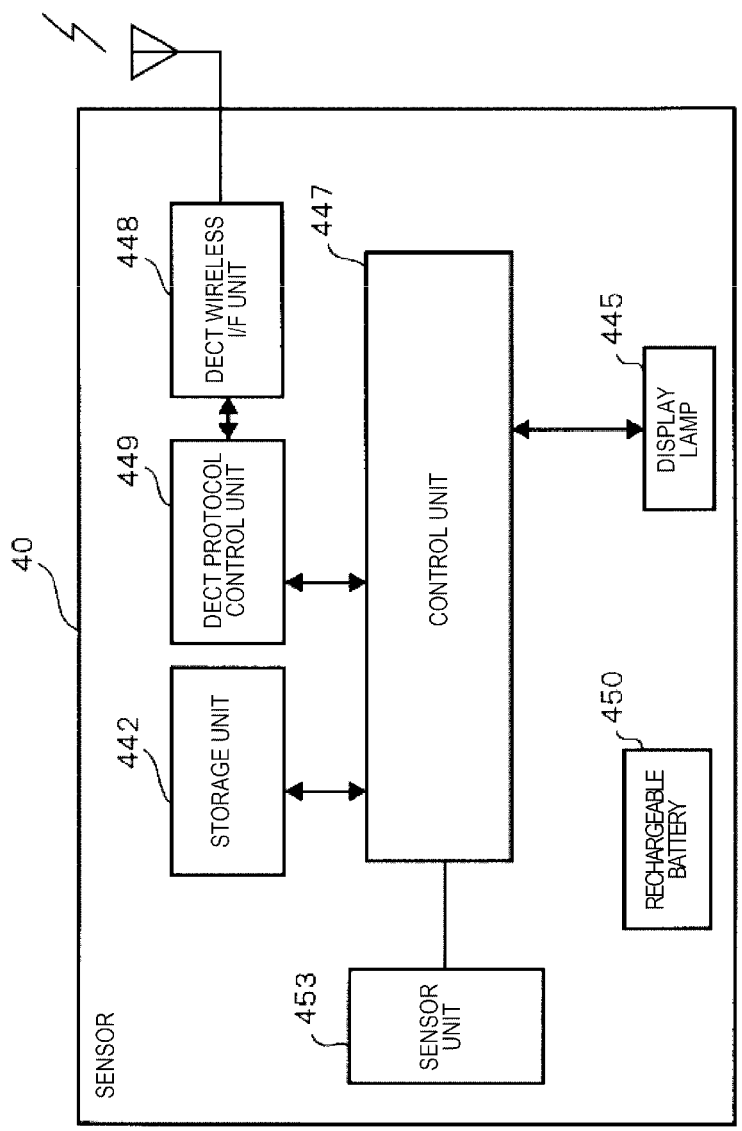
FIG. 5 is a block diagram illustrating an internal configuration of a sensor.

FIG. 5 is a block diagram illustrating an internal configuration of sensor 40. Sensor 40 includes control unit 447, storage unit 442, and display lamp 445. Sensor 40 performs a predetermined detection operation, such as turning on display lamp 445, in a case of detecting a target (for example, an intruder which is also the same for the following description).

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a window or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke.

A rechargeable battery 450 is a battery which can be charged and supplies power to each unit.

Figure 6:
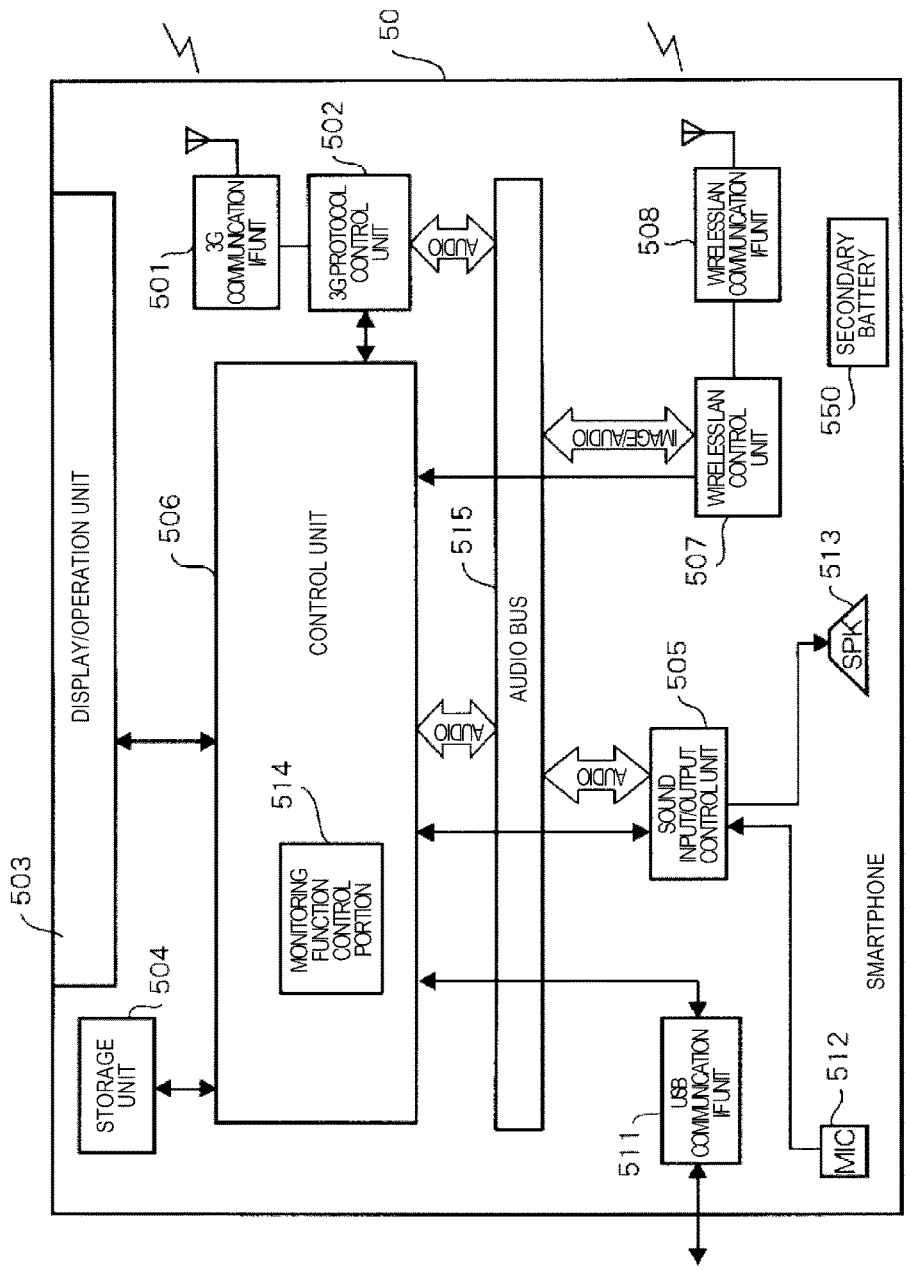
FIG. 6 is a block diagram illustrating an internal configuration of a smartphone.

FIG. 6 is a block diagram illustrating an internal configuration of smartphone 50. Smartphone 50 includes control unit 506, storage unit 504, and display/operation unit (touch panel) 503. Smartphone 50 receives various input operations and displays information such as an image on touch panel 503. Monitoring function control portion 514 which can set a function of camera 30 is built into control unit 506 as will be described later. Touch panel 503, which is a display/input unit in which a display unit and an operation unit are integrally formed, displays information such as an image or an icon on a screen and receives a tap operation (or a touch operation) which is performed on the screen by a user.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, a memory, or the like having an interface of a universal serial bus (USB) standard.

A description will be made of an operation of monitoring camera system 5 having the above-described configuration.

First, an operation of smartphone 50 will be described. A description will be made of a case where an application of the monitoring camera, registered as an application for home security and installed in smartphone 50 by a user, is activated.

Figure 7:
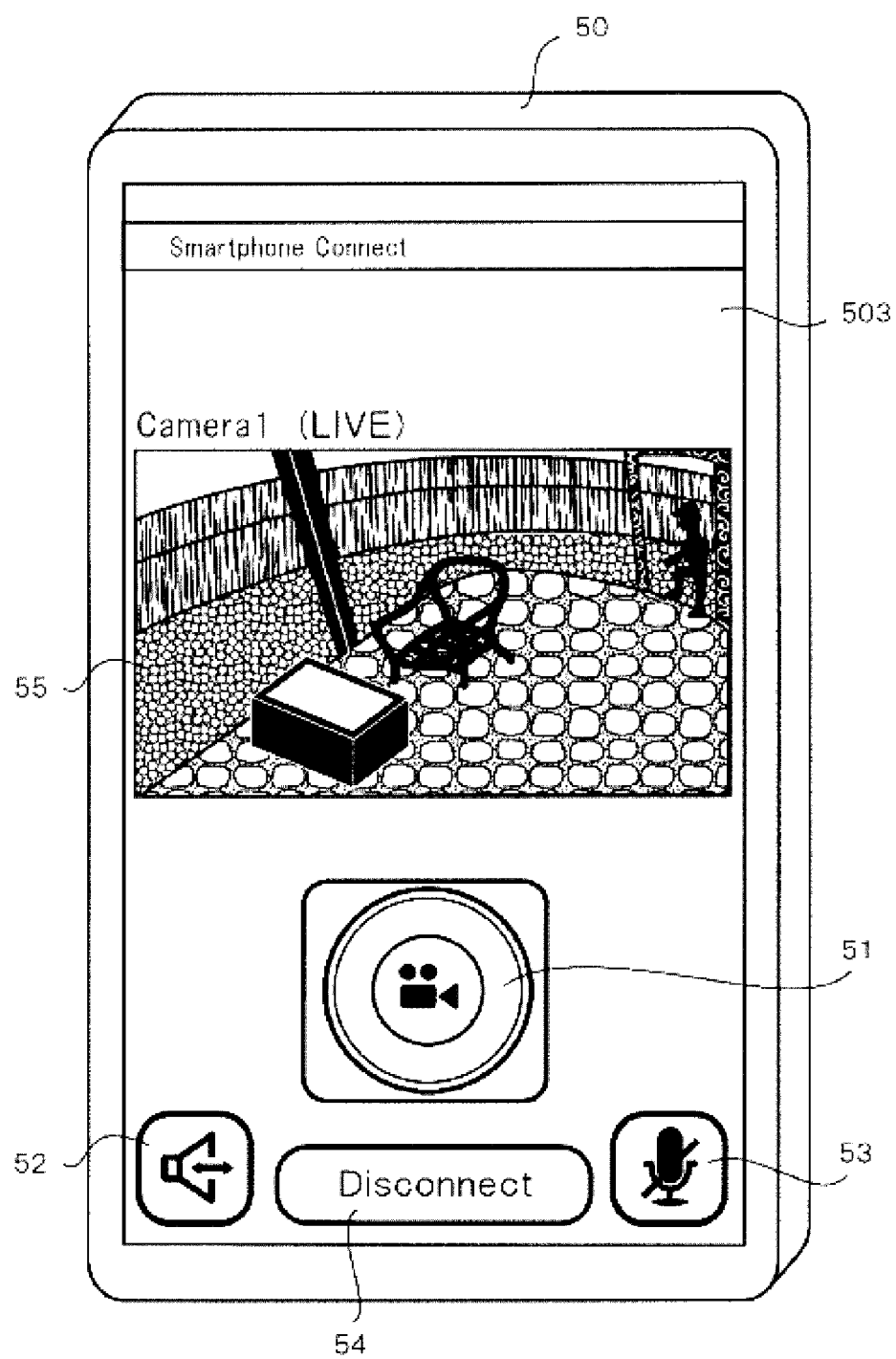
FIG. 7 is a diagram illustrating an example of a live monitoring screen of the smartphone, which is activated as an application for home security and is displayed when a monitoring camera does not perform video recording.

FIG. 7 illustrates an example of a live monitoring screen which is activated as an application for home security and is displayed when monitoring camera 30B does not perform video recording. Image (moving image) 55 captured by camera 30 is displayed at a center of touch panel 503 which is displayed due to the activation of the application. Camera icon 51, speaker icon 52, mute icon 53, and disconnect icon 54 are displayed on the screen of touch panel 503 so that a tap operation can be performed thereon.

Camera icon 51 is an icon used to instruct camera 30 to start video recording and to set a function of camera 30.

Speaker icon 52 is an icon used to switch a volume of speaker 513 mounted in smartphone 50 and is in a turned-on state during the activation. When a tap operation is performed on speaker icon 52, speaker icon 52 can switch between a turned-on state and a turned-off state. Herein, speaker icon 52 is displayed green in a turned-on state and is displayed white in a turned-off state.

The turned-on state of speaker icon 52 is a state in which the volume of speaker 513 is set to be high and is suitable for typical monitoring or a hands-free call (a speaker phone call).

On the other hand, the turned-off state of speaker icon 52 is a state in which the volume of speaker 513 is set to be low as if whispered in a user's ear, and is suitable for sound monitoring or a handset call.

Mute icon 53 is an icon used to switch turning-on and turning-off of microphone 512 mounted in smartphone 50, and is in a turned-on state during activation, that is, in an invalid (silent) state of microphone 512. When a tap operation is performed on mute icon 53, mute icon 53 can switch between a turned-on state and a turned-off state. Herein, in the same manner as speaker icon 52, mute icon 53 is displayed green in a turned-on state and is displayed white in a turned-off state.

Disconnect icon 54 in which characters "disconnect" are written is an icon used to disconnect camera 30, and is in a turned-off state during activation, that is, in a connection state.

Figure 9:
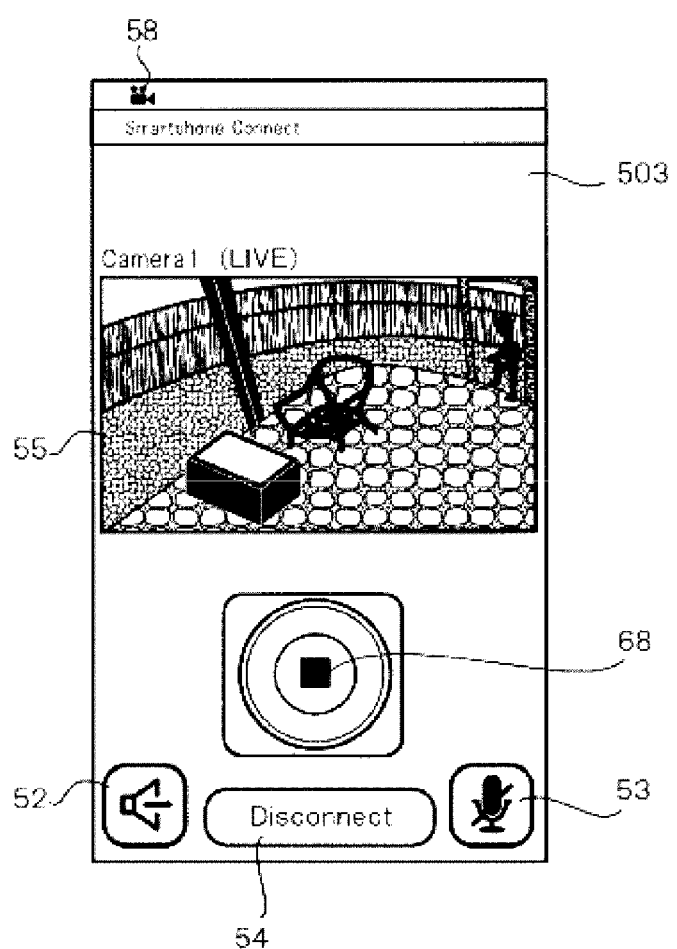
FIG. 9 is a diagram illustrating a live monitoring screen of the smartphone which is displayed when the monitoring camera is performing video recording.

FIGS. 8A to 8C are diagrams illustrating transition of a screen of smartphone 50 when the application is activated. FIG. 9 is a diagram illustrating a live monitoring screen of smartphone 50 displayed when monitoring camera 30B is performing video recording.

FIG. 8A illustrates a standby screen displayed on touch panel 503. On the standby screen, in addition to home security icon 56 for activating the home security application, various icons 57 are displayed so that a tap operation can be performed thereon. Recording icon 58 indicating video recording is displayed at an upper left corner of touch panel 503.

In the present embodiment, an operation in which master device 10 stores image data and audio data transmitted from monitoring camera 30B in image memory 116 is referred to as a video recording operation, and this video recording operation also includes sound recording.

When a tap operation is performed on home security icon 56, as illustrated in FIG. 8B, login screen 59 is displayed on touch panel 503. Herein, if an ID and a password are entered into boxes displayed on login screen 59, the home security application is activated. If the home security application is activated, as illustrated in FIG. 8C, a home screen of the application is displayed on touch panel 503. Group 63 of various icons including monitoring camera icon 61 and group 64 of various keys are displayed on the home screen. Also on the home screen, recording icon 58 indicating video recording is still displayed at the upper left corner of touch panel 503.

If the user performs a tap operation on monitoring camera icon 61, the application of the monitoring camera is activated, and, as illustrated in FIG. 9, an image (live image) 55 captured by monitoring camera 30B is displayed at the screen center of touch panel 503. Along with speaker icon 52, mute icon 53, and disconnect icon 54 described above, a recording stop icon 68 for giving an instruction for stopping of video recording is displayed on a lower side of a screen of touch panel 503 unlike in the live monitoring screen (refer to FIG. 7). If a tap operation is performed on recording stop icon 68, master device 10 stops video recording as will be described later. If the video recording is stopped, recording icon 58 displayed at the upper left corner of touch panel 503 disappears, and the present screen changes to a screen (refer to FIG. 7) on which camera icon 51 is displayed instead of recording stop icon 68.

FIGS. 10A to 10C are diagrams illustrating transition of a screen of smartphone 50 when human sensor 40B detects a target during display of the standby screen. FIG. 10A illustrates the standby screen displayed on touch panel 503. As described above, on the standby screen, in addition to home security icon 56 for activating the home security application, various icons 57 are displayed so that a tap operation can be performed thereon. Since human sensor 40B does not detect a target, recording icon 58 indicating video recording is not displayed at the upper left corner of touch panel 503.

If a target is detected by human sensor 40B during the display of the standby screen, touch panel 503 displays recording stop control screens illustrated in FIG. 10B or 10C. Which recording stop control screen is selected may be arbitrarily set in advance by the user. Master device 10 may transmit a signal for selecting a recording stop control screen, and the recording stop control screen may be selected on the basis of the signal.

If the screen switches to the recording stop control screen, smartphone 50 rings speaker 513 so as to inform the user of starting of video recording with an alarm sound for a predetermined time (for example, for three minutes). Recording icon 58 indicating video recording is displayed at the upper left corner of touch panel 503.

Image checking icon 71 and ringing stop icon 72 are displayed on both of the recording stop control screens illustrated in FIGS. 10B and 10C. A message "Outdoor camera is recording" indicating that image data captured by outdoor monitoring camera 30B is being recorded is displayed on the recording stop control screen illustrated in FIG. 10C.

Image checking icon 71 is used to check an image which is being recorded. If a tap operation is performed on image checking icon 71 by the user, the above-described touch panel 503 transitions to login screen 59 illustrated in FIG. 8B. If a user ID and a password are entered on login screen 59, and a tap operation is performed on monitoring camera icon 61 on the home screen illustrated in FIG. 8C, image 55 which is being recorded is displayed as illustrated in FIG. 9. The user checks live image 55, and may stop the video recording by performing a tap operation on recording stop icon 68 when it is determined that the image is not necessary.

Ringing stop icon 72 is an icon in which characters "Stop" are written, and is used to stop ringing of an alert sound by smartphone 50 and master device 10. In a case where master device 10 performs ringing due to detection by human sensor 40B, for example, if the user determines that there is no problem as a result of checking an image, a tap operation is performed on ringing stop icon 72 so that ringing performed by smartphone 50 and master device 10 can be stopped.

As described above, if a tap operation is performed on recording stop icon 68 by the user, the video recording is stopped, and the screen returns to the original standby screen illustrated in FIG. 10A. If stoppage of the video recording has been completed, recording icon 58 displayed at the upper left corner of touch panel 503 disappears. As mentioned above, the recording stop control screen is displayed, and thus the user can rapidly stop video recording or can check an image which is being recorded.

FIGS. 11A to 11C are diagrams illustrating transition of a screen of smartphone 50 when human sensor 40B detects a target during display of a home screen of the home security application. FIG. 11A illustrates the home screen displayed on touch panel 503.

As described above, group 63 of various icons including monitoring camera icon 61 and group 64 of various keys are displayed on the home screen so that a tap operation can be performed thereon. Since human sensor 40B does not detect a target, recording icon 58 indicating video recording is not displayed at the upper left corner of touch panel 503.

If a target is detected by human sensor 40B during the display of the home screen, touch panel 503 displays recording stop control screens illustrated in FIG. 11B or 11C in the same manner as in FIGS. 10B and 10C.

If the screen changes to the recording stop control screen, smartphone 50 rings speaker 513 so as to inform the user of starting of video recording with an alarm sound for a predetermined time (for example, for three minutes). Recording icon 58 indicating video recording is displayed at the upper left corner of touch panel 503.

Image checking icon 71 and ringing stop icon 72 are displayed on both of the recording stop control screens illustrated in FIGS. 11B and 11C. A message "Outdoor camera is recording" indicating that image data captured by outdoor monitoring camera 30B is being recorded is displayed on the recording stop control screen illustrated in FIG. 11C.

Image checking icon 71 is used to check an image which is being recorded. If a tap operation is performed on image checking icon 71 by the user, image 55 which is being recorded illustrated in FIG. 9 is displayed since the login to the home security application has finished. The user checks live image 55, and may stop the video recording by performing a tap operation on recording stop icon 68 when it is determined that the image is not necessary.

Recording stop icon 68 is used to instantly stop the video recording. If a tap operation is performed on recording stop icon 68 by the user, the video recording is stopped, and the screen returns to the original home screen illustrated in FIG. 11A. If stoppage of the video recording has been completed, recording icon 58 displayed at the upper left corner of touch panel 503 disappears.

As mentioned above, the recording stop control screen is displayed, and thus the user can rapidly stop video recording or can check an image which is being recorded.

Next, a flow of an operation of monitoring camera system 5 will be described with reference to FIGS. 12 and 13.

Figure 13:
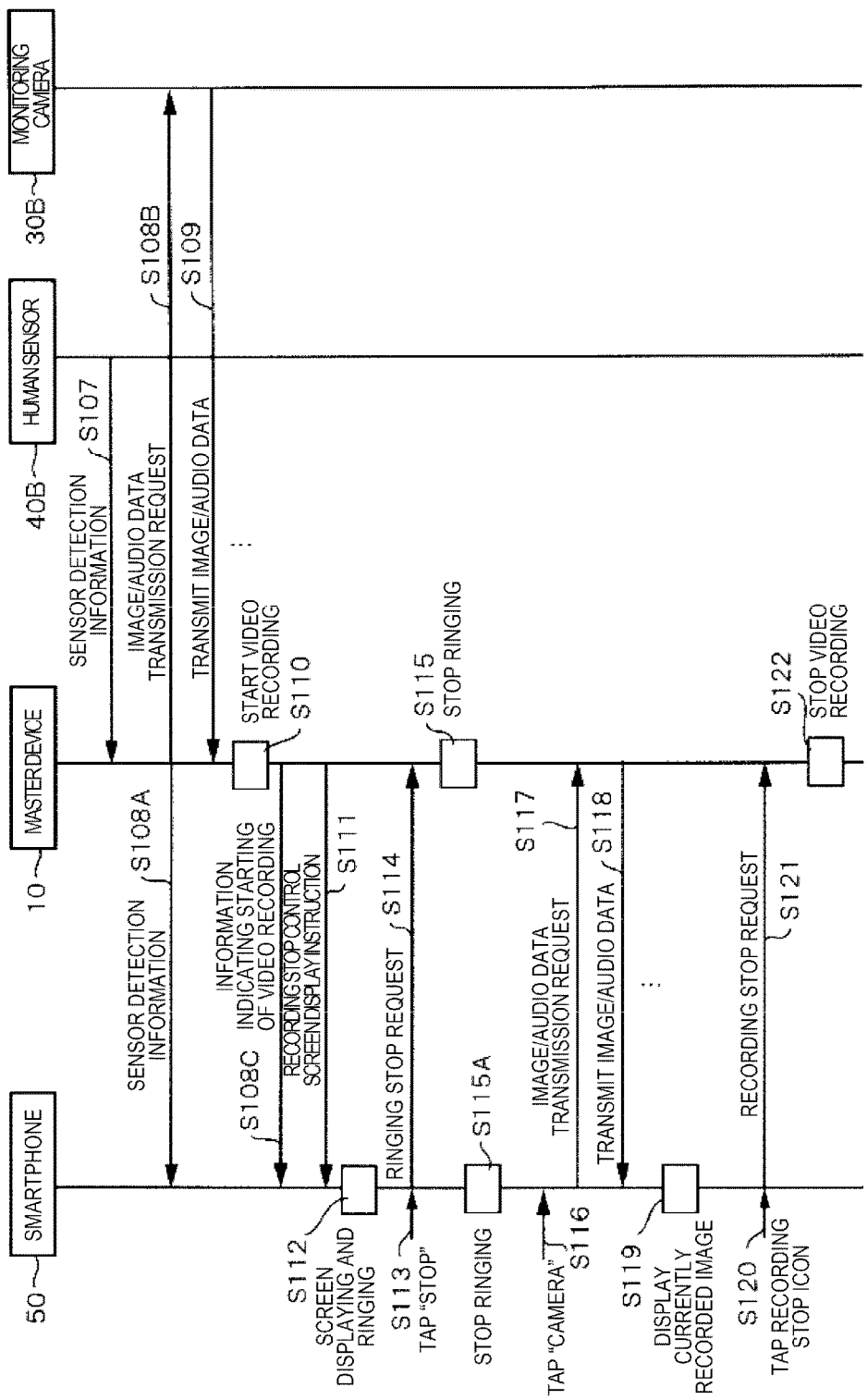
FIG. 13 is a sequence diagram illustrating a flow of an operation of the monitoring camera system.

FIGS. 12 and 13 are sequence diagrams illustrating a flow of an operation of monitoring camera system 5. Here, a description will be made of an operation of monitoring an intruder (target) or the like by using human sensor 40B and monitoring camera 30B provided outdoors. Here, an automatic recording mode in which master device 10 automatically starts video recording in a case where a target is detected by human sensor 40B may be arbitrarily set by the user.

First, a description will be made of a flow of an operation in a case where the automatic recording mode is not set. The case where the automatic recording mode is not set is a case where cooperation with the sensor is not set, and automatic recording is not started even if human sensor 40B detects a person.

As illustrated in FIG. 12, if human sensor 40B detects a person present outdoors, a detection signal and sensor detection information are transmitted to master device 10 (step S101). If the sensor detection information is received from human sensor 40B, master device 10 is wirelessly connected to smartphone 50 by using the wireless LAN (step S102), and transmits the sensor detection information to smartphone 50 when the connection has been completed (step S103A).

Master device 10 requests monitoring camera 30B to transmit image/audio data (step S103B). If the request for transmission of image/audio data is received, monitoring camera 30B is connected to master device 10 by using the wireless LAN, and transmits image data captured by image capturing unit 312 and audio data collected by microphone 328 to master device 10 (step S104).

If a monitoring instruction such as starting of the application of the monitoring camera is received from the user (step S105-1), smartphone 50 requests master device 10 to transmit the image/audio data (step S105-2). In response to the request for transmission of the image/audio data from smartphone 50, master device 10 transmits the image data and the audio data which have been transmitted from monitoring camera 30B, to smartphone 50 (step S106). Consequently, smartphone 50 displays a live monitoring screen (refer to FIG. 7).

Next, a description will be made of a flow of an operation in a case where the automatic recording mode is set. The case where the automatic recording mode is set is a case where cooperation with the sensor is set, and video recording is automatically started when human sensor 40B detects a person.

As illustrated in FIG. 13, if human sensor 40B detects a person present outdoors, a detection signal and sensor detection information are transmitted to master device 10 (step S107). If the sensor detection information is received from human sensor 40B, master device 10 is wirelessly connected to smartphone 50 by using the wireless LAN, and transmits the sensor detection information to smartphone 50 when the connection has been completed (step S108A).

Master device 10 requests monitoring camera 30B to transmit image/audio data (step S108B). If the request for transmission of image/audio data is received, monitoring camera 30B is connected to master device 10 by using the wireless LAN, and transmits image data captured by image capturing unit 312 and audio data collected by microphone 328 to master device 10 (step S109).

Master device 10 starts an operation of storing the image data and the audio data transmitted from monitoring camera 30B in image memory 116 (image storage unit) (step S110). Here, in a case where an operation of master device 10 is set so that an alarm sound is output, master device 10 performs ringing. Master device 10 transmits information indicating video recording start to smartphone 50 (step S1080. Master device 10 instructs smartphone 50 to display a recording stop control screen (including recording icon 58) (step S111).

If this instruction is received, smartphone 50 displays the recording stop control screens illustrated in FIGS. 10B, 10C, 11B and 11C on touch panel 503 (step S112). At this time, smartphone 50 rings speaker 513 so as to inform the user of starting of video recording with an alarm sound for a predetermined time (for example, for three minutes).

If a tap operation is performed on ringing stop icon 72 in a state in which the recording stop control screen is displayed (step S113), smartphone 50 transmits a ringing stop request to master device 10 (step S114). If the ringing stop request is received, master device 10 stops the ringing of speaker 129 (step S115). Smartphone 50 stops the ringing of speaker 513 (step S115A).

On the other hand, if a tap operation is performed on image checking icon 71 denoted by "Camera" for the user giving an instruction for image display in a state in which the recording stop control screen is displayed (step S116), smartphone 50 requests master device 10 to transmit image/audio data (step S117). In response to the request for transmission of the image/audio data from smartphone 50, master device 10 transmits image data and audio data which are being recorded, to smartphone 50 (step S118).

If the image data and the audio data which are being recorded are received from master device 10, smartphone 50 displays the image which is being recorded as illustrated in FIG. 9 (step S119). If a tap operation is performed on recording stop icon 68 by the user in a state in which the image which is being recorded is displayed (step S120), smartphone 50 sends a recording operation stop request to master device 10 (step S121).

In response to the recording operation stop request, master device 10 stops the operation (storage operation) of storing the image data and the audio data transmitted from monitoring camera 30B in image memory 116 (step S122).

FIG. 14 is a flowchart illustrating an operation procedure of master device 10. Master device 10 starts the present operation with a detection signal from human sensor 40B as a trigger.

In FIG. 14, first, master device 10 acquires sensor detection information from human sensor 40B (step S1). Master device 10 starts a video recording operation in which image data and audio data transmitted from monitoring camera 30B are stored in image memory 116 (step S2).

Master device 10 determines whether or not there is a transmission request of image data and audio data from smartphone 50 (step S3). If there is a transmission request, master device 10 transmits the image data and the audio data transmitted from monitoring camera 30B, to smartphone 50, also transmits information indicating the starting of the video recording, and gives an instruction for displaying the recording stop control screen including recording stop icon (recording operation stop button) 68 (step S4).

Master device 10 waits for recording stop icon 68 to be pressed (tap operation) (step S5). If recording stop icon 68 is pressed, master device 10 stops the video recording operation. Then, master device 10 finishes the present operation (step S7).

On the other hand, if there is no transmission request of image data and audio data from smartphone 50 in step S3, master device 10 waits for a predetermined period of time to elapse (step S6). If the predetermined period of time has elapsed, master device 10 stops the video recording operation in step S7. Herein, if the predetermined period of time has elapsed, the video recording is automatically stopped, but the video recording may be automatically stopped at the time when human sensor 40B does not detect a target even before the predetermined period of time has not elapsed.

Then, master device 10 finishes the present operation. Master device 10 enters a standby state until being activated with a detection signal from human sensor 40B as a trigger again.

As mentioned above, in monitoring camera system 5 of the present embodiment, if human sensor 40B detects an intruder (target), sensor detection information is sent to master device 10. Master device 10 transmits the sensor detection information sent from human sensor 40B, to smartphone 50, and also sends a signal for giving an instruction for transmission of image data to monitoring camera 30B which is registered in correlation with human sensor 40B. Master device 10 starts a video recording operation in which image data and audio data transmitted from monitoring camera 30B are stored in image memory 116 according to the sensor detection information sent from human sensor 40B. If a tap operation is performed on image checking icon 71, smartphone 50 sends information regarding the operation to master device 10. Master device 10 sends the image data and the audio data transmitted from monitoring camera 30B, to smartphone 50, according to the information regarding the operation. If a tap operation on recording stop icon 68 displayed on touch panel 503 is received in a state in which the image data sent from monitoring camera 30B is displayed on touch panel 503, smartphone 50 sends a request signal for stopping the video recording operation to master device 10.

Therefore, according to monitoring camera system 5 of the present embodiment, when master device 10 performs the video recording operation in which image data and audio data transmitted from the camera are stored in image memory 116, the user can instruct master device 10 to stop the video recording. Consequently, monitoring camera system 5 can prevent image data which is not needed by the user from being recorded.

Since monitoring camera system 5 does not store image data and audio data which are not needed by a user, it is possible to shorten time for the user to reproduce the image data and check content thereof. Monitoring camera system 5 can facilitate editing work, such as cutting of a scene of image data which is not needed by the user. Monitoring camera system 5 can minimize storage capacities of storage unit 103 and image memory 116.

If there is a request signal for stopping video recording from smartphone 50, master device 10 stops the video recording, and thus stoppage of the video recording is reliably performed.

As sensor 40, human sensor 40B may be built into a single casing integrally with monitoring camera 30B. Infrared sensor 313 which is integrally built into monitoring camera 30B may be used as a human sensor. Consequently, in monitoring camera system 5, a camera and a sensor can be easily correlated with each other.

Since recording icon 58 is displayed on a screen of touch panel 503 of smartphone 50, a user can understand that video recording is being performed.

Since recording icon 58 is displayed when video recording is started, a user can promptly take an action.

Since video recording is started when sensor 40 detects a target, it is possible to minimize an amount of stored image data.

Since smartphone 50 outputs an alarm sound by ringing speaker 513 in response to a notification sent from master device 10 according to a detection performed by sensor 40, a user can understand the detection performed by sensor 40 and starting of video recording through the sound.

In a case where camera 30 and sensor 40 are separate bodies, a degree of freedom of arrangements of the camera and the sensor increases.

A user can perform operations of checking an image and stopping video recording with smartphone 50 even at a remote place, and thus convenience increases.

Although the various embodiments have been described with reference to the drawings, needless to say, the present invention is not limited to such embodiments. It is obvious that a person skilled in the art can conceive of various modifications or alterations within the scope recited in the claims, and thus it is understood that they naturally fall within the technical scope of the present invention.

For example, in the above-described present embodiment, a description has been made of a case where the present invention is applied to a monitoring camera system, but the present invention is not limited thereto and is applicable to, for example, a communication system in which a traveler who possesses a camera converses with a friend or the like who possesses a portable terminal while viewing an image captured on a journey or the like.

What is claimed is:

1. A monitoring camera system comprising:
   a monitoring camera;
   a sensor; and
   a master device that, in operation, performs wireless communication with the monitoring camera and the sensor;
   wherein the master device,
   in response to receiving a detection signal from the sensor, receives image data captured by the monitoring camera and starts recording the image data in a storage device, and transmits, via a wireless router to a smartphone that is connected to a mobile phone network, an instruction to display a first icon indicating that the image data is being recorded and an instruction to display a second icon to stop recording of the image data;
   in response to receiving, via the wireless router, a request for the image data from the smartphone, transmits the image data via the wireless router to the smartphone for display on the smartphone; and
   in response to receiving, via the wireless router, user selection of the second icon on the smartphone, stops recording the image data in the storage device.

2. The monitoring camera system of claim 1, wherein the monitoring camera includes a microphone; and
   wherein the master device,
   in response to receiving the detection signal from the sensor, receives audio data captured by the microphone and starts recording the audio data in the storage device;

in response to receiving, via the wireless router, a request for the audio data from the smartphone, transmits the audio data via the wireless router to the smartphone for audio output from the smartphone; and in response to receiving, via the wireless router, user selection of the second icon on the smartphone, stops recording the audio data in the storage device.

3. The monitoring camera system of claim 1, wherein the monitoring camera includes a wireless LAN communicator.

4. A monitoring method based on a monitoring camera system, the monitoring camera system comprising: (a) a monitoring camera; (b) a sensor; and (c) a master device that, in operation, performs wireless communication with the monitoring camera and the sensor; the monitoring method comprising:

in response to receiving, at the master device, a detection signal from the sensor, the master device receiving image data captured by the monitoring camera; starting recording the image data in a storage device; transmitting, via a wireless router to a smartphone that is connected to a mobile phone network, an instruction to display a first icon indicating that the image data is being recorded and an instruction to display a second icon to stop recording of the image data;

in response to receiving, via the wireless router, a request for the image data from the smartphone, the master device transmitting the image data via the wireless router to the smartphone for display on the smartphone; and in response to receiving, via the wireless router, user selection of the second icon on the smartphone, the master device stopping recording the image data in the storage device.

5. The monitoring method of claim 4, wherein the monitoring camera further includes a microphone, and the monitoring method comprises:

in response to receiving, at the master device, the detection signal form the sensor, the master device receiving audio data captured by the microphone and starting recording the audio data in the storage device;

in response to receiving, via the wireless router, a request for the audio data from the smartphone, the master device transmitting the audio data via the wireless router to the smartphone for audio output from the smartphone; and in response to receiving, via the wireless router, user selection of the second icon on the smartphone, the master device stopping recording the audio data in the storage device.

6. The monitoring method of claim 4, wherein the monitoring camera includes a wireless LAN communicator.

* * * * *